June 21, 1932.  F. A. PEARSON  1,864,092
METHOD AND APPARATUS FOR ELECTRICAL MEASUREMENT
Filed July 8, 1927
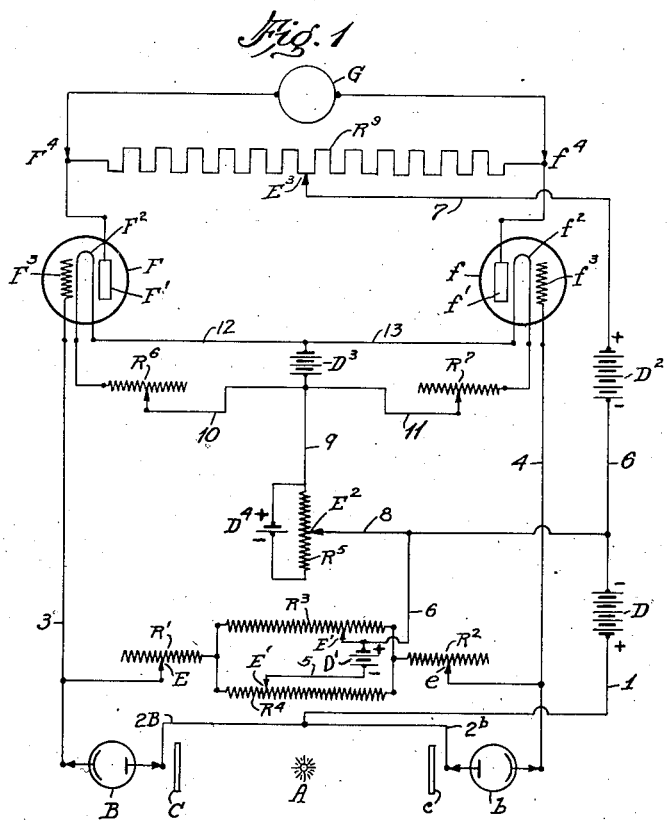
INVENTOR
FREDERICK A. PEARSON
BY
ATTORNEY Patented June 21, 1932

1,864,092

UNITED STATES PATENT OFFICE

FREDERICK A. PEARSON, OF GREAT BARRINGTON, MASSACHUSETTS

METHOD AND APPARATUS FOR ELECTRICAL MEASUREMENT

Application filed July 8, 1927. Serial No. 204,397.

The present invention comprises improved means for, and an improved method of accurately measuring minute differences in electrical quantities, primarily devised and especially adapted for use in measuring, detecting or comparing the effects produced in photo-electric cells of minute variations in the intensity or character of the light to which said cells are exposed. Owing to the minute electrical changes produced by the very small changes in the light conditions to which the cells are exposed in uses for which the invention is of especial value, it is desirable in some cases, to obtain the desired result by comparing the effects produced upon two cells, when one is exposed to a standard light condition, while the other is exposed to a test light condition, rather than by an absolute measurement of the effect produced on a single cell by the test light condition.

For the purpose of the invention, I have devised improved potential amplifying means including thermionic valves of the three electrode type, and provisions for eliminating or compensating for errors or fluctuations in what may be referred to as duplicate parts of the comparative system, which fluctuations do not result from, but do tend to obscure determinable differences between the standard and test potential or light conditions.

The invention is adapted for use in such operations as the comparison of the electromotive force of a test battery with that of a standard cell, and analogous measurements of very small differences of current or voltage; and is especially adapted for use in determining the intensity and character of the light from an independent source as compared with that from a known source; in determining the phosphorescent, opalescent, reflective, or refractive properties of bodies which differ but little from one another in respect to such properties; and in determining the opacity of materials in general, and in particular for the purpose of detecting differences in thickness or character between successive portions of paper or cloth, or other material, as it passes through a fabricating machine, and in general in detecting, measuring or comparing minute variations in the light conditions to which photo electric cells may be subjected.

The various features of novelty which characterize my invention are pointed out with particularity in the claims annexed to and forming a part of this specification. For a better understanding of the invention, however, and the advantages possessed by it, reference should be made to the accompanying drawing and descriptive matter in which I have illustrated preferred embodimemnts of my invention.

Of the drawing:

Fig. 1 is a diagrammatic representation of apparatus for determining the light transmitting properties of sheet material;

Fig. 2 is a diagrammatic representation of a portion of the apparatus shown in Fig. 1, modified to determine variations in luminosity characteristics of bodies; and Fig. 3 is a diagrammatic representation of a second modification of the apparatus shown in Fig. 1 for comparing the intensity of light emitted by an independent source with that from a standard source.

In the use of the invention illustrated in Fig. 1, A represents a source of light, and B and $b$ represent photo electric cells to which light from the source A is transmitted by bodies in the form of sheets or plates C and $c$, respectively, of more or less restricted transparency. In a normal use of the apparatus shown in Fig. 1, with sheets C and $c$ differing but little in transparency from one another, the source of light A is located between and equally distant from the cells B and $b$, and the latter are so chosen as to be as nearly identical in form and characteristics as is practically possible. The bodies C and $c$ are similarly disposed with respect to the source of the light A and the cells B and $b$, between which and said source said bodies are respectively placed.

The cells B and $b$ are connected in corresponding cell circuits on which similar potential differences are impressed by a common source of potential D. The circuit for the cell B includes a conductor 1 leading from the positive terminal of the potential source D, conductor 2B, cell B, conductor 3, contact E, resistance R′, a portion of a resistance bridge comprising resistances R³ and R⁴, conductor 5, and conductor 6 back to the second terminal of D. The circuit for the cell $b$ includes the conductor 1, conductor 2b, cell $b$, conductor 4, contact $e$, resistance R², a portion of the resistance bridge, conductors 5 and 6, and potential source D.

As the applied potential D is the same for both cell circuits, the values of the currents in the two circuits will be in inverse proportion to the values of their respective total resistances. The amount of current in each circuit is subject to the control of the operator by adjustment of contacts E and $e$ along the resistances R′ and R², respectively. The resistances R′ and R², and the resistances of the cells themselves are so large in comparison with the bridge resistances R³ and R⁴ that the hereinafter mentioned adjustment along the resistances R³ and R⁴ of the ends of the conductor 5 does not significantly effect the strengths of the currents flowing through the cell circuits. When the contacts E and $e$ are once correctly placed, the amount of current in each cell circuit is controlled by the resistance of the cell B or $b$, in said circuit. Since the resistance of a photo electric cell is a function of the light received by that cell, it is apparent that the amount of current which flows in each cell circuit is a function of the light received by the corresponding cell.

Since each cell would receive the same amount of light energy from the source A if none of the light were intercepted, the relative strengths of the curents flowing in the cell circuits measure the relative opacity or luminosity of materials C and $c$.

The cell currents, in ordinary practice, are of values measured in microamperes, and are too small to be correctly recorded by available measuring instruments except under laboratory conditions. It follows then that the difference between these currents is too minute to be determined by present instruments under manufacturing conditions. To increase the effective values of these currents in true proportion, so that they may be measured under manufacturing conditions by suitable meters or recording potentiometers, I have provided amplifying means including three electrode thermionic valves F and $f$.

It is apparent that a potential or voltage drop occurs from the contact point E across resistance R′, which drop is proportional to the current passing through this resistance. In like manner a potential drop occurs across resistance R². These potentials are impressed by conductors 3 and 4 upon the grids F³ and $f^3$ of the amplifying valves F and $f$. Thus the effect of light on the cells B and $b$ is transmitted to the amplying devices.

The previously mentioned resistances R³ and R⁴ form part of a bias and control component for the amplifying means. The extremities of the resistances R³ and R⁴ are connected together and to the previously mentioned resistances R′ and R². Each resistance is engaged by a corresponding movable contact E′, and the two contacts E′ are connected by a conductor 5 including a source of potential D′. The conductor 5 is connected by conductors 6 and 8 to a movable contact E² engaging a resistance R⁵, across which resistance is connected a source of potential D⁴, and this resistance R⁵ is connected at one end by conductor 9 to the filament circuit of the thermionic valves F and $f$. The effect of moving either contact E′ along the corresponding resistance R³ or R⁴, is to throw the bias of potential D′ gradually from one grid to the other without disturbing the balance of resistances R′ and R², or disturbing the bias caused by D⁴ and its resistance R⁵. The effect of moving the center contact E² of resistance R⁵, is to increase or diminish the bias on the grids F³ and $f^3$ relative to the filament circuit equally and simultaneously, without disturbing the resistances R′ and R² or the resistance bridge adjustments.

The filament circuits of the valves F and $f$ here shown, comprise a source of potential D³ which is connected to the filaments F² and $f^2$ in parallel, by conductors 10 and 11, including adjustable resistances R⁶ and R⁷, respectively, and conductors 12 and 13. The filament circuits are of conventional type except for the resistances R⁶ and R⁷ which are introduced to compensate for variations in the mechanical and electrical constants of the amplifying thermionic valves.

The plates F′ and $f'$ of the amplifying thermionic valves, F and $f$, are connected by a resistance R⁹, engaged by a movable contact E³, which is connected by conductor 7 to the positive end of a source of potential D². The negative end of this source of potential is connected by conductor 6, conductor 8, resistance R⁵ and conductor 9, and to the filament circuits. The current flowing through conductor 7 from potential source D² divides, part flowing through one portion of resistance R⁹ to the plate F′ and thence to filament F², and the remaining part flowing through the other portion of resistance R⁹ to the plate $f'$, and thence to the filament $f^2$.

It will be apparent, in the case where contact E³ is at the center of the resistance R⁹, thus making the two portions of the resistance R⁹ equal, that the drops in potential due to the current flowing between E³ and F′ and between E³ and $f'$, will each be a measure of the current flow in the corresponding portion of the resistance R⁹. In consequence, the difference in potential of points F′ and $f'$ is a function of the difference of the currents flowing from E³ to F′ and E³ to $f'$, and can be measured by a suitable sensitive potential measuring device G connected to the terminal point F⁴ and f⁴, which are connected to F' and f', respectively. The measuring device indicates not only the difference of potential between points F⁴ and f⁴, but also which point is positive or negative with respect to the other.

Since the potential difference impressed on the instrument G is a function of the difference between the two currents flowing through the portions of the resistance R⁹ at opposite sides of the contact E³, and since the strength of each of these currents is controlled by the plate to filament resistance of the corresponding thermionic valves F or f, and since the plate to filament resistance of each valve is controlled by the potential difference between the grid and filament of the valve, it follows that the quantity measured by the device G is a function of the amount of light falling on the corresponding cells B and b which determines the grid to filament potential differences of the valves. It thus follows that the quantity measured by the instrument G is an amplified measure of the difference in the amounts of light passed to the cells B and b through the material parts C and c.

With properly adjusted apparatus of the character illustrated in Fig. 1, the difference of potential between the valve terminals F⁴ and f⁴ can be reduced to zero when light is transmitted to the cells B and b from the source A through objects C and c of approximately equal opacity. With the two similar sides of the measuring apparatus thus balanced, on the replacement of either object C or c by a new light transmitting object, the minute differences in light intercepting properties between the new object and the object still in place can be determined from the difference in potential between the points F⁴ and f⁴ then measured by the instrument G.

With the apparatus disclosed, however, variations in the mechanical and electrical constants of the several parts of the apparatus tend to the introduction of errors of great magnitude relative to minute quantities measured, and unless the effects of these variations are balanced out or adequately compensated for the measurements obtained with the instrument G will ordinarily be highly inaccurate.

The adjusting means, including the movable resistance engaging control contacts E, e, etc. provided in the apparatus disclosed, permit of the effective balancing out or compensating for the effects of variations found in commercially produced photo-electric cells and thermionic valves, provided care is exercised in selecting the cells and valves so as to minimize the cell and valve differences. With the described apparatus compensations for variations in the operation of the two photo-electric cells is accomplished by adjusting the contacts E and e, and thereby the portions of the resistances R' and R² included in the cell energizing circuits. Compensations for variations in the amplifying characteristics of the two thermionic valves F and f is accomplished by the adjustments of the portions of the resistances R⁶ and R⁷ in the filament circuits, by the adjustment of the contact E³ along the resistance R⁹, by the adjustment of the bridge contacts E', and by the adjustment of the contact E² along the resistance R⁵. When the various adjustments referred to are properly made, slight variations in the intensity of the light from the source A, and in the potentials applied by the potential sources D, D² and D³ will be balanced out as both sides of the apparatus will amplify equally. The sources of potential D' and D⁴ should be so chosen that practically no fluctuation in their voltage will occur during the operation of the device.

As indicated above, the adjustment of the contacts E and e along the resistances R' and R², when once properly effected, should not be disturbed, since these adjustments determine the drops in potential which are passed through the amplifying apparatus to the instrument connected to the terminal points F⁴ and f⁴. Owing to the large magnitude of the resistances R' and R² relative to the bridge resistances R³ and R⁴ and the arrangement of the contacts E', the adjustments of the latter do not significantly affect the total resistance in each cell circuit, but the adjustment of the contacts E' does permit of a material adjustment of the bias potential of one of the grids F³ and f³ relative to the other. This change in bias varies the relative strengths of the two plate circuit currents of the two valves and may be employed to equalize those currents when the system as a whole is otherwise in balance. A plate current equalizing effect may also be had by adjusting the contact E³ along the resistance R⁹. The relative adjustment of the portions of the resistances R⁶ and R⁷ in the two filament circuits serves the purpose of equalizing, or minimizing the differences in the plate current changes in the two valves produced by similar changes in grid potential.

By adjustment of the contact E² the bias of the two valves may be similarly adjusted. This adjustment is of value in practical operation in maintaining the two plate currents at approximately constant value thus maintaining the proportionality between the values shown by the instrument when different pairs of objects like C and c are being compared.

As the plate circuits of thermionic valves and as photo electric cells will permit current to flow but in one direction, it is of little consequence whether applied potentials D, D² or D³ are sources of direct or alternating current, as the positive component only will be permitted to flow. D' and D⁴, however, should be sources of direct current.

In Fig. 2 I have illustrated the use of the invention in comparing the luminosity characteristics of two oils, one contained in a glass tube M, and the other in a glass tube m. The tubes M and m are shown as occupying the same relative positions relative to one another, and the tubes B and b as do the objects C and c of Fig. 1. Light screens O prevent direct impingement of light from the source A on the cells B and b. The cells B and b of Fig. 2 may be connected and used exactly as described in connection with Fig. 1.

Fig. 3 illustrates the use of the apparatus shown in Fig. 1 to compare the light emissions from separate light sources A and a. As shown, the light from the source A is reflected onto the cell B by a mirror P, and the light from the source a is reflected onto the cell b by a mirror Q. By tilting the latter into the dotted line position Q' it will reflect light from the source A onto the cell b as is useful in balancing the apparatus preparatory to its use in comparing light from 2 sources.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:—

1. In combination two three electrode thermionic valves, means connecting the grid elements of said valves, said means including a resistance bridge connected between said elements, means for establishing a potential difference between said elements, and means adjustably connected to said bridge at separated points thereof for creating a grid bias for each valve, the points of connection between the last mentioned means and said bridge being adjustable along the bridge to adjust the grid bias of each valve simultaneously in opposite directions.

2. In combination two three electrode thermionic valves, means connecting the grid elements of said valves, said means including a resistance bridge connected between said elements, means for establishing a potential difference between said elements, means adjustably connected to said bridge at separated points thereof for creating a grid bias for each valve, the points of connection between the last mentioned means and said bridge being adjustable along the bridge to adjust the grid bias of each valve simultaneously in opposite directions, and means for adjusting the grid bias of each valve simultaneously in the same direction.

3. The combination with two photo-electric cells, of cell energizing means including a common source of current and resistances in circuit portions individual to the two cells, amplifying means including a pair of three electrode thermionic valves having their grids connected to said circuit portions at points between which a potential difference is created by a difference in resistances of the two cells, a resistance and a measuring instrument connected in parallel with one another between the plates of said valves, a connection from an intermediate point in said resistance to a common point of the filament circuits of said valves, means for impressing a bias on each grid filament circuit including provisions for adjusting the bias on the two circuits similarly to regulate the strength of the plate currents, and relatively to one another to compensate for irregularities in the valves.

4. The combination with two photo-electric cells, of a resistance bridge, adjustable resistances connecting similar terminals of the two cells to the ends of said bridge, a source of current connected between the other terminals of said cells and said bridge, amplifying means including a pair of three electrode thermionic valves having their grids connected one to one, and the other to the second of the first mentioned cell terminals, a measuring instrument connected to the plate elements of said valves, and means for impressing a control bias on the grid filament circuits of said valves including a source of current adjustably connected across said bridge, and a regulable source of current connected between said bridge and the filament circuits of said valves.

5. Apparatus for amplifying the difference between two potentials of nearly equal value comprising a pair of three electrode thermionic valves, means for impressing one potential on the grid element of one valve and the other potential on the grid element of the second valve, bias control means connecting the grid and filament circuit elements of the two valves including provisions for similarly varying the potential difference between each grid and the corresponding filament circuit, and provisions including a common source of potential difference for changing the potential difference between the grid and filament circuit of one valve relative to the other, a galvanometer and a potentiometer resistance connected in parallel between the plate elements of the two valves, and a source of current connected between an intermediate point in said resistance and the filament circuits.

6. In an optical testing device, including a photo-electric cell and a source of light adapted to pass light through material to be tested to said cell, the combination of means for producing a compensating potential, and means for amplifying the difference between said potential and the cell potential comprising three-electrode thermionic valve amplifying means, and a balancing circuit by which said amplifying means, the cell, and the means for producing the compensating potential, are connected, said balancing circuit comprising a Wheatstone bridge having the resistances of its four arms relatively adjustable and having two opposed arm junctions connected to different grid elements of said amplifying means, a source of potential difference connected between the other two arm junctions of the bridge, and a connection between one of the last mentioned junctions and the filaments of said amplifying means.

Signed at New York city in the county of New York and State of New York this 7th day of July, A. D. 1927.

FREDERICK A. PEARSON.